UNITED STATES PATENT OFFICE.

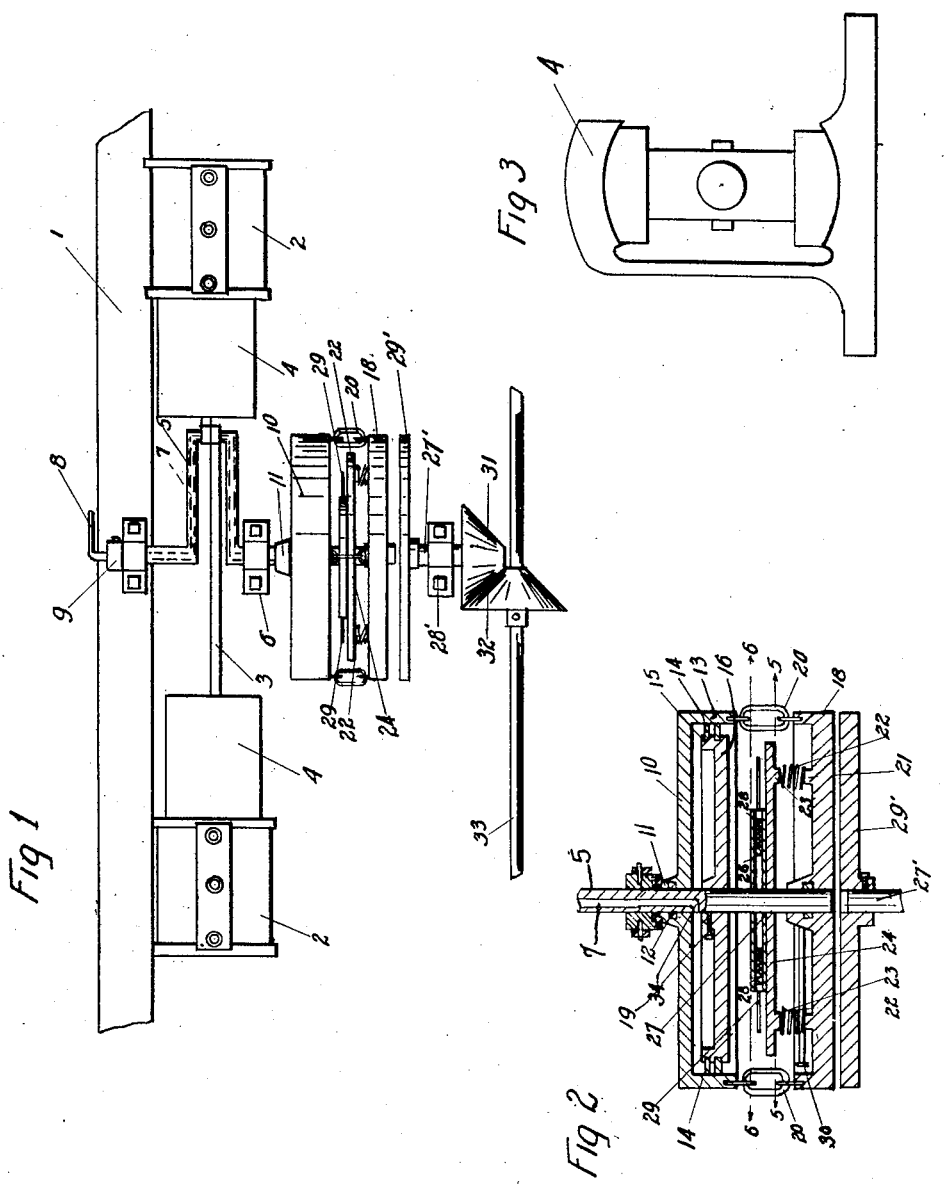

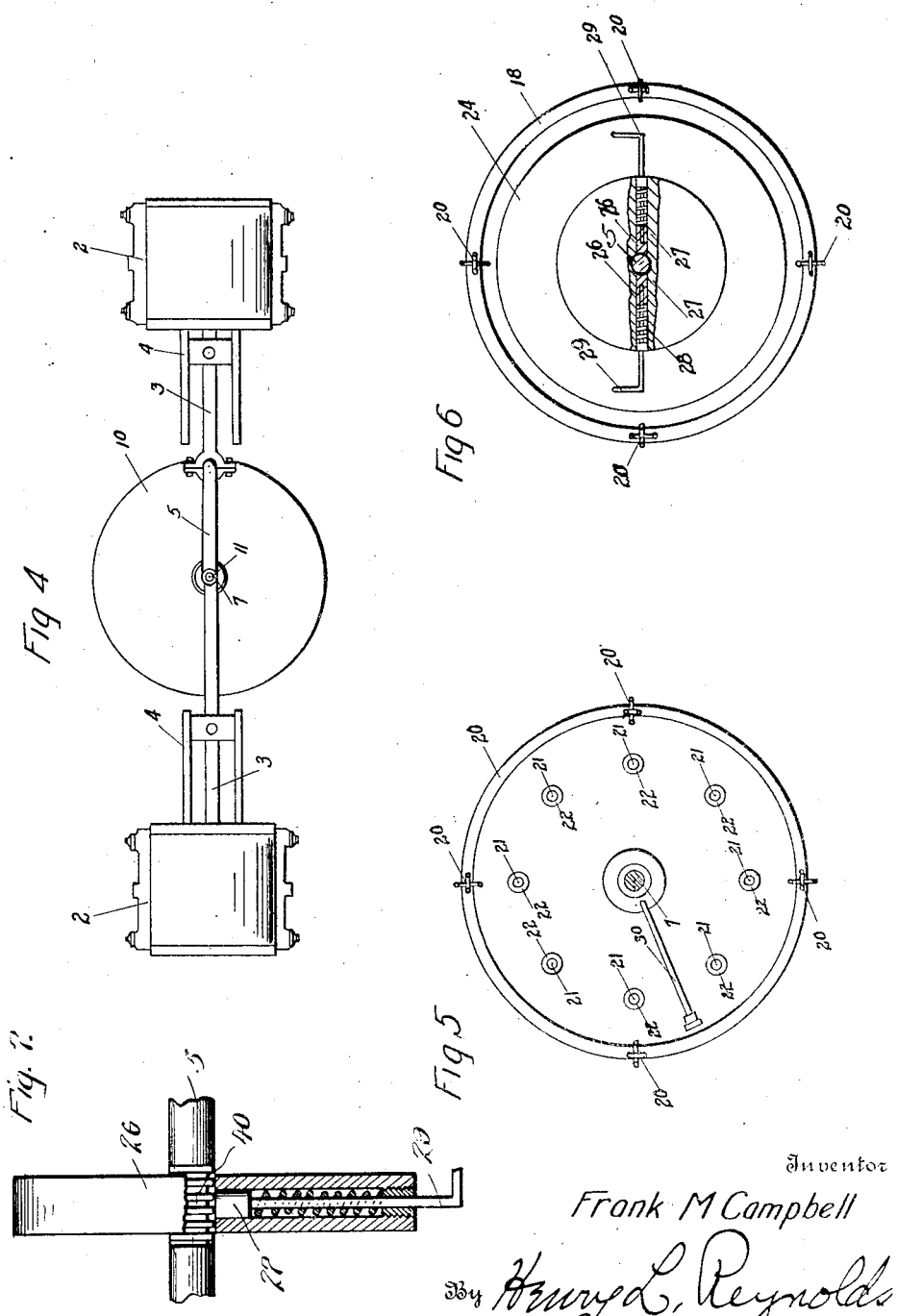

FRANK M. CAMPBELL, OF SEATTLE, WASHINGTON.

FLUID-CONTROLLED CLUTCH MECHANISM.

1,347,322.  Specification of Letters Patent.  Patented July 20, 1920.

Application filed April 15, 1918. Serial No. 228,576.

*To all whom it may concern:*

Be it known that I, FRANK M. CAMPBELL, a citizen of the United States, and resident of Seattle, county of King, State of Washington, have invented certain new and useful Improvements in Fluid-Controlled Clutch Mechanism, of which the following is a specification.

My invention relates to improvements in fluid controlled clutch mechanisms and more particularly to mechanism of this character for controlling the operation of an air compressor in accordance with a certain desired air pressure maintained within a reservoir connected with the compressor.

The object of the invention is to provide clutch mechanism of this character which will be simple, durable and efficient and which comprises novel means for admitting air thereinto so as to actuate the mechanism to effect starting and stopping of the compressor so that a certain desired pressure within a storage reservoir is maintained.

With these and other objects in view, as will become more apparent as the description proceeds, the invention consists in certain novel features of construction, combination and arrangement of parts, as will be hereinafter more fully described and claimed.

For a complete understanding of my invention, reference is to be had to the following description and accompanying drawings, in which:

Figure 1 is a plan view of an air compressor and its driving clutch constructed in accordance with my invention.

Fig. 2 is a longitudinal sectional view of the pneumatic clutch.

Fig. 3 is a transverse sectional view illustrating guides for the compressor.

Fig. 4 is a side elevation of the device.

Fig. 5 is a sectional view taken on the line 5—5 of Fig. 2.

Fig. 6 is a similar view taken on the line 6—6 of Fig. 2.

Fig. 7 is an enlarged detail view illustrating the means whereby locking adjustment of an adjustable disk is effected with the crank shaft.

Referring in detail to the drawings, the numeral 1 indicates a supporting structure having positioned thereon relatively spaced air compressing pump cylinders 2 of any desired construction in which are provided pistons having piston rods 3. The piston rods 3 are slidable in suitable guides 4, as clearly illustrated in Fig. 3, and are connected to a crank 5 journaled in relatively spaced bearings 6 upon the supporting structure 1. The crank shaft is provided with an air passage 7 extending therethrough and to which is connected an air supply pipe 8 leading to an air reservoir (not shown) and is secured to the crank shaft by a suitable coupling 9.

A disk 10 is slidably mounted upon one end of the crank shaft 5 adjacent one of the bearings 6 and is provided with a base 11 in which are positioned packing rings 12 to establish an air tight connection between the disk 10 and the crank shaft. The disk 10 is provided with an annular flange 13 that engages packing rings 14 carried by an annular flange 15 formed upon a stationary smaller disk 16 that is inclosed within the disk 10 and which is secured to the crank shaft by a set screw 19. A clutch plate 18 is slidably splined on the shaft 5 in spaced relation to the disk 16 and is provided with a stuffing box. Links 20 connect the clutch plate 18 with the annular flange 13 formed upon the disk 10. A plurality of studs 21 are formed upon the inner face of the clutch plate 18 and receive coil springs 22 that are carried by lugs 23 formed on the clutch actuating disk 24 that is longitudinally adjustable upon the crank shaft 5. Alongside of the clutch actuating disk 24 is the disk 26 having oppositely extending bosses that have slidable therein looking members 27 that are adapted to engage keyways 40 in the crank shaft 5 under the influence of springs 28 so as to hold the actuating disk 24 in adjusted position upon the crank shaft 5. Suitable handles 29 are threaded within these bosses to thereby increase and decrease the tension of the springs 28 so as to adjust the tension of the locking members 27 upon the crank shaft when desiring to adjust the position of the clutch actuating disk 24. By adjusting the position of the clutch actuating disk 24 upon the shaft 5, the tension of the springs 22 may be readily increased and decreased as desired. A suitable oil cup 30 is associated with the crank shaft and the clutch for the purpose of lubricating the same.

A stub shaft 27' is journaled to the supporting structure 1 by suitable bearings 28' and has secured to its inner end a clutch member or disk 29' adapted to coöperate with the axially movable rotatively secured clutch disk 18. The stub shaft 27' has secured to its outer end a friction gear 31 adapted to engage the friction gear 32 carried by the drive shaft 33. The passage 7 through the crank shaft terminates in an outlet port 34 between the disks 10 and 16 so as to admit air therebetween.

In operation, when the air pressure within the reservoir to which the compressors 2 are connected, is low, the springs 22 force the clutch disk 18 into engagement with the clutch disk 29' which causes the crank shaft 5 to be rotated by the drive shaft 33 operating the compressing pistons 4 of cylinders 2 and as the air pressure within the reservoir reaches a certain degree it will move the disks 10 and 16 apart, overcoming the tension of the springs 22, disengaging the clutch disk 18 from the clutch disk 29', stopping the operation of the air compressors.

From the foregoing description taken in connection with the accompanying drawings, it will be noted that a novel means has been provided wherein the air pumps will be automatically started when the air pressure within the reservoir becomes low and which will automatically stop the air pumps when the air pressure within the reservoir reaches a certain degree.

While I have shown and described the preferred embodiment of my invention, it will be understood that minor changes in construction, combination and arrangement of parts may be made without departing from the spirit and scope of the invention, as claimed.

What I claim as my invention is:

1. A clutch device for actuating air compressors comprising a driven disk mounted to turn with the compressor actuating shaft and movable axially thereof, a driving disk facing thereto, a piston fixed to the compressor actuating shaft, a cylinder for said piston movable on the same shaft, members connecting said driven disk with said cylinder, and independent means acting to yieldingly force said driven member against said driving member.

2. A clutch device for actuating air compressors comprising a shaft, a driving shaft alined therewith, a driving disk secured upon the driving shaft, a driven disk upon the first shaft and facing said driving disk, said driven disk being movable axially upon its shaft to engage and disengage with the driving disk, a member fixed to the first shaft, springs interposed between said fixed member and the driven member and acting to force the driven member into frictional engagement with the driving member, a piston and cylinder therefor mounted on the driven shaft, one movable axially thereof, said movable part being actuatively connected with the said driven member to control its disengagement from the driving member.

3. A clutch device for actuating air compressors and the like comprising a driven shaft, a driving shaft therefor alined therewith, a driving and a driven disk adapted to frictionally engage their faces and secured each to its respective one of said shafts, the driven disk being movable axially of its shaft, a disk adjustably secured to the driven shaft, springs interposed between said latter disk and the driven disk and acting to contact the friction surfaces of said disks, a piston disk secured to the driven shaft, a cylinder for said piston movable axially of the driven shaft, and links connecting said cylinder with the driven friction disk to counteract the action of the springs thereon.

Signed this 5th day of April, 1918.

FRANK M. CAMPBELL.